United States Patent
Kawazoe et al.

(10) Patent No.: US 8,633,419 B2
(45) Date of Patent: Jan. 21, 2014

(54) LASER WELDING QUALITY EVALUATION METHOD AND APPARATUS

(75) Inventors: Yuji Kawazoe, Toyota (JP); Masahiro Nishio, Toyota (JP); Tsunaji Kitayama, Aichi-gun (JP); Yasuhiro Ishii, Aichi-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1270 days.

(21) Appl. No.: 12/514,549

(22) PCT Filed: Aug. 6, 2008

(86) PCT No.: PCT/JP2008/064499
§ 371 (c)(1),
(2), (4) Date: May 12, 2009

(87) PCT Pub. No.: WO2009/022699
PCT Pub. Date: Feb. 19, 2009

(65) Prior Publication Data
US 2009/0272725 A1 Nov. 5, 2009

(30) Foreign Application Priority Data
Aug. 10, 2007 (JP) .................... 2007-210231

(51) Int. Cl.
*B23K 26/20* (2006.01)
(52) U.S. Cl.
USPC ..................... 219/121.64; 382/141
(58) Field of Classification Search
None
See application file for complete search history.

(56) References Cited

U.S. PATENT DOCUMENTS

| 5,671,743 A | 9/1997 | Kawai et al. |
| 2002/0003133 A1* | 1/2002 | Mukasa et al. ........... 219/121.84 |
| 2005/0121422 A1* | 6/2005 | Morden et al. ............ 219/121.6 |

FOREIGN PATENT DOCUMENTS

| CN | 1141156 A | 1/1997 |
| JP | 60-027489 A | 2/1985 |
| JP | 04-118193 A | 4/1992 |
| JP | 05-177372 A | 7/1993 |
| JP | 09-300087 A | 11/1997 |
| JP | 10-314973 A | 12/1998 |
| JP | 2882273 B | 2/1999 |
| JP | 2000-042769 A | 2/2000 |
| JP | 2006-043741 A | 2/2002 |
| JP | 2002-361452 A | 12/2002 |
| JP | 3403697 B | 2/2003 |
| JP | 2003-256814 A | 9/2003 |
| JP | 2006-082129 A | 3/2006 |

* cited by examiner

*Primary Examiner* — Stephen R Koziol
*Assistant Examiner* — Amandeep Saini
(74) *Attorney, Agent, or Firm* — Kenyon & Kenyon LLP

(57) ABSTRACT

A difference processing circuit receives input of welding images taken by a CCD camera in real time and then differentiates power monitoring images recorded in a memory from welding images to obtain difference processing reflected light images. Due to the difference processing performed by a difference processing circuit, foreign matter images included in welding images and power monitoring images are eliminated and the difference processing reflected light images that are obtained do not include any foreign matter images. A quality judgment device uses the difference processing reflected light images obtained by a difference processing circuit and conducts a quality judgment. As described above, since difference processing reflected light images do not include any foreign matter images, a quality judgment device does not receive any influence from the foreign matter that is adhered to the protective glass and can conduct an excellent evaluation of the welding quality.

4 Claims, 5 Drawing Sheets

FIG. 2
| | (a) WELDING IMAGE | (b) POWER MONITORING IMAGE | (c) IMAGE AFTER DIFFERENCE PROCESSING |
|---|---|---|---|
| EXAMPLE 1 |  |  |  |
| EXAMPLE 2 |  | | 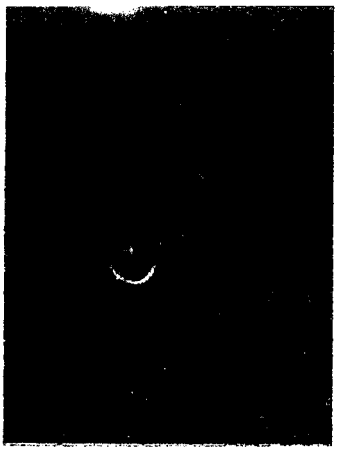 |

(a) ORIGINAL POWER MONITORING IMAGE  (b) RESULT OF EXTRACTING THE EXCESSIVE REFLECTED LIGHT COMPONENTS

LASER WELDING QUALITY EVALUATION METHOD AND APPARATUS

This is a 371 national phase application of PCT/JP2008/064499 filed 6 Aug. 2008, claiming priority to Japanese Patent Application No. JP 2007-210231 filed 10 Aug. 2007, the contents of which are incorporated herein by reference.

TECHNICAL FIELD

The present invention relates to art for evaluating the quality of laser-welded products, in particular, a laser welding quality evaluation method and an apparatus therefor that evaluate the quality of welding using the images of light reflected during welding that are obtained from the laser light reflected from the welding portion.

BACKGROUND ART

Examples of conventional laser welding quality evaluation methods are described in Patent Document 1 and Patent Document 2.

The laser welding quality evaluation method described in Patent Document 1 separates by wavelength the light produced from the laser irradiation position into the reflected laser light and the vapor light such that the welding laser light and the optical axis are on the same axis. Then the welding quality evaluation method conducts measurement and thus evaluates a welding quality.

The laser welding quality evaluation method described in Patent Document 2 interprets the reflected laser light as an image and then conducts evaluation of the quality of the welding.

Furthermore, on the laser processing apparatus that conducts laser welding, a protective glass is conventionally provided to protect the optical system of the laser from sputter (flying bits of melted metal) and fumes (smoky gas) produced at the time of laser welding. Patent Documents 3 and 4 describe methods of monitoring the status of the protective glass.

Patent Document 1: Japanese Patent Application Publication No. JP-A-2000-42769
Patent Document 2: Japanese Patent Application Publication No. JP-A-2006-043741
Patent Document 3: Japanese Patent Application Publication No. JP-A-4-118193
Patent Document 4: Japanese Patent Application Publication No. JP-A-2002-361452

DISCLOSURE OF THE INVENTION

Problem to be Solved by the Invention

However, even though a protective glass is conventionally provided to protect the optical system of the laser at the time of laser welding, sputter or other foreign matter can become adhered to the protective glass when welding is conducted repeatedly. In this case, the CCD camera or other means of imaging, which is placed on the same axis as the laser, obtains images (reflected laser light images) based on the reflected laser light coming from the welding portion that is the target of the laser irradiation and also receives light that has been reflected by the foreign matter (foreign matter reflected light) on the protective glass. The reflected laser light that is received by the means of imaging also includes light that has been reflected by the foreign matter and consequently the reflected laser light images obtained by the means of imaging do not include information just from the welding portion, but also information from the foreign matter.

Due to this, identifying the reflected light for image analysis in order to conduct an evaluation of the quality becomes unstable. Furthermore, the judgment result may also become unstable if the reflected light from foreign matter is misidentified as melted metal or the fluctuation component of the keyhole. This problem becomes even more significant as the size of the foreign matter that is adhered to the protective glass becomes larger.

The present invention was devised in light of the problem described above and it is an object of the present invention to provide a laser welding quality evaluation method and an apparatus therefor that can conduct an excellent evaluation of the quality of welding while also controlling the influence exerted by the foreign matter that is adhered to the protective glass.

Furthermore, another object of the present invention is to provide a laser welding quality evaluation method and an apparatus therefor that can adequately interpret the status of the protective glass.

Means for Solving the Problem

According to the present invention, a laser welding quality evaluation method irradiates a laser light toward a welding portion and receives a reflected laser light from the welding portion through a protective glass that protects an optical system of a laser, images the welding portion using the received reflected laser light, and evaluates a welding quality using the welding image that is obtained by the imaging. The laser welding quality evaluation method is characterized by including the steps of: obtaining a power monitoring image by imaging an irradiation board provided in place of the welding portion during power monitoring, which is a time when welding is not performed, using a reflected laser light from the irradiation board; and differentiating the power monitoring image from the welding image so as to obtain a difference processing reflected light image for evaluating the welding quality.

According to the present invention, the difference processing reflected light image is obtained in order to conduct the welding quality evaluation by differentiating the power monitoring image from the welding image. The difference processing eliminates the reflected light from the foreign matter that is adhered to the protective glass and so an excellent evaluation of the welding quality can be conducted that is free from the influence caused by the foreign matter that is adhered to the protective glass.

Exemplary Form of the Invention

The present invention is composed of the following form made up of items (1) to (6).

(1) A laser welding quality evaluation method irradiates a laser light toward a welding portion and receives a reflected laser light from the welding portion through a protective glass that protects an optical system of a laser, images the welding portion using the received reflected laser light, and evaluates a welding quality using the welding image that is obtained by the imaging. The laser welding quality evaluation method is characterized by including the steps of: obtaining a power monitoring image by imaging an irradiation board provided in place of the welding portion during power monitoring, which is a time when welding is not performed, using a reflected laser light from the irradiation board; and differentiating the power monitoring image from the welding image so as to obtain a difference processing reflected light image for evaluating the welding quality.

(2) The laser welding quality evaluation method according to item (1) above is characterized in that: in the power monitoring image obtaining step, the power monitoring image is obtained in a time series starting from when the laser begins irradiating, and the obtained time series power monitoring image is recorded; and in the difference processing step, the welding image is obtained in a time series starting from when the laser begins irradiating and the time series power monitoring image is differentiated from the time series welding image by synchronizing the two time series.

(3) A laser welding quality evaluation method is characterized by including the steps of: receiving, during power monitoring, which is a time when welding is not performed, a reflected laser light from an irradiation board through a protective glass that protects an optical system of a laser; obtaining a power monitoring image by performing imaging using the received reflected laser light; and determining a status of the protective glass based on the power monitoring image.

(4) A laser welding quality evaluation apparatus irradiates a laser light toward a welding portion and receives a reflected laser light from the welding portion through a protective glass that protects an optical system of a laser, images the welding portion using the received reflected laser light, and evaluates a welding quality using the welding image that is obtained by the imaging. The laser welding quality evaluation apparatus is characterized by including: means for obtaining a power monitoring image by imaging an irradiation board provided in place of the welding portion during power monitoring, which is a time when welding is not performed, using a reflected laser light from the irradiation board; and means for differentiating the power monitoring image from the welding image so as to obtain a difference processing reflected light image for evaluating the welding quality.

(5) The laser welding quality evaluation apparatus according to item (4) above is characterized in that: in the power monitoring image obtaining means, the power monitoring image is obtained in a time series starting from when the laser begins irradiating, and the obtained time series power monitoring image is recorded, and in the difference processing means, the welding image is obtained in a time series starting from when the laser begins irradiating, and the time series power monitoring image is differentiated from the time series welding image by synchronizing the two time series.

(6) A laser welding quality evaluation apparatus is characterized by including: means for receiving, during power monitoring, which is a time when welding is not performed, a reflected laser light from an irradiation board through a protective glass that protects an optical system of a laser; means for obtaining a power monitoring image by performing imaging using a reflected laser light received by the means for receiving a reflected laser light from the irradiation board; and means for determining a status of the protective glass based on the power monitoring image obtained by the power monitoring image obtaining means.

According to the forms in items (1) and (4), in order to evaluate the welding quality, a difference processing reflected light image is obtained by differentiating the power monitoring image from the welding image. As a result of the difference processing, the reflected light from foreign matter that is adhered to the protective glass is eliminated and an excellent evaluation of the welding quality can be conducted that is free from the influence caused by the foreign matter that is adhered to the protective glass.

According to the forms in items (2) and (5), it is possible to obtain a reflected light image (image after difference processing) based only on the original welding and that is not influenced by the heat strain on the protective glass. Therefore, it is possible to improve the precision of the welding quality evaluation.

According to the forms in items (3) and (6), a judgment is made on the status of the protective glass based on the power monitoring image and the presence of foreign matter on and deterioration of the protective glass can be recognized during power monitoring. As a result, it is possible to plan for production quality declines, such as decreases in laser processing output, without extending the cycle time.

Effects of the Invention

According to the present invention, in order to evaluate the welding quality, a difference processing reflected light image is obtained by differentiating the power monitoring image from the welding image. As a result of the difference processing, the reflected light from foreign matter that is adhered to the protective glass is eliminated and an excellent evaluation of the welding quality can be conducted that is free from the influence caused by the foreign matter that is adhered to the protective glass.

BRIEF DESCRIPTION OF THE DRAWINGS

FIG. 2 shows photographs of welding images, power monitoring images, and difference processing reflected light images from example 1 and example 2, which are examples of implementation of the first embodiment through actually conducting laser welding;

DESCRIPTION OF THE REFERENCE NUMERALS

8 CCD CAMERA
9 SIGNAL PROCESSING DEVICE
15 PROTECTIVE GLASS
17 QUALITY JUDGMENT DEVICE
20 IRRADIATION BOARD
21 MEMORY
22 DIFFERENCE PROCESSING CIRCUIT

BEST MODES FOR CARRYING OUT THE INVENTION

Hereinafter, a first embodiment of the present invention will be described with reference to the drawings.

Figure 1:
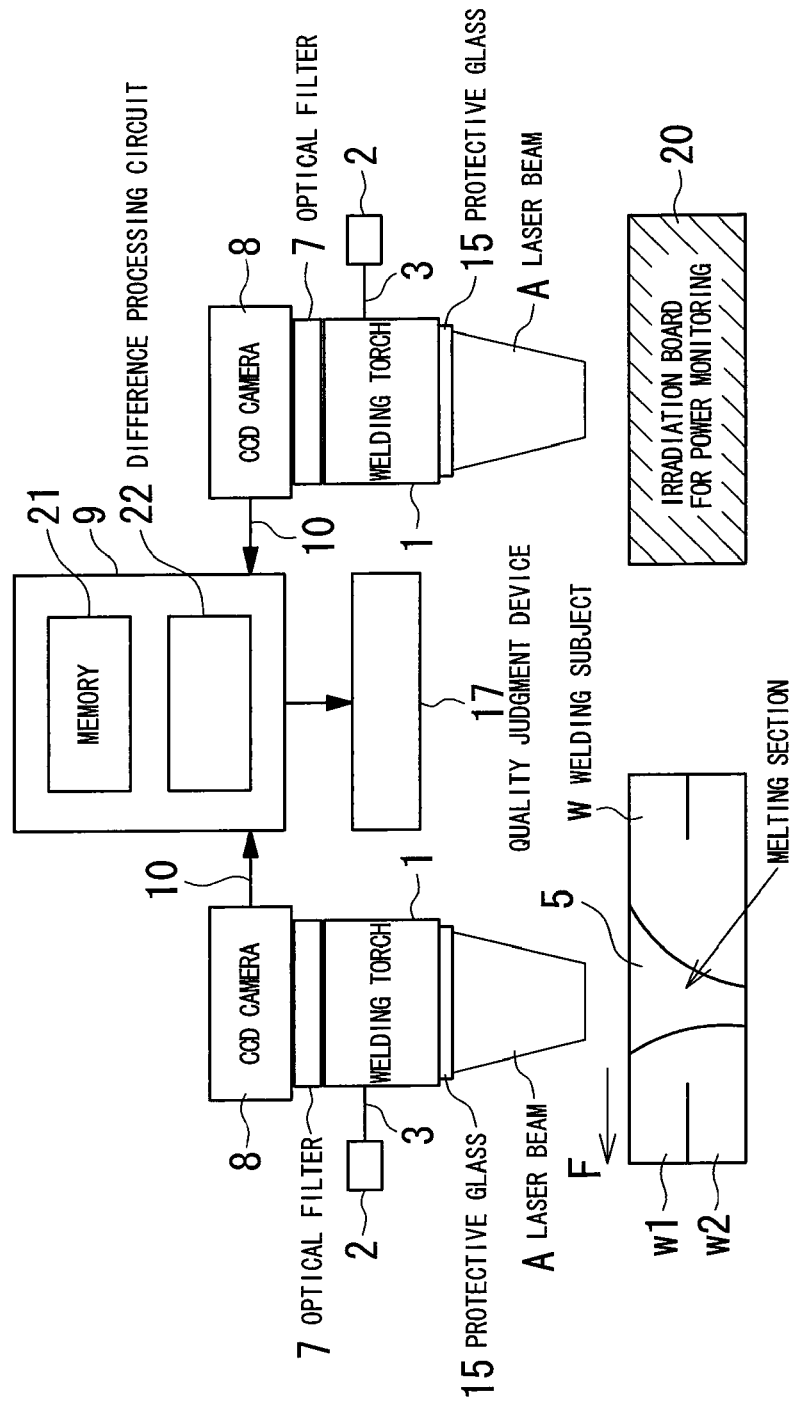
FIG. 1 is a diagram schematically showing a laser welding quality evaluation apparatus according to a first embodiment of the present invention.

An embodiment of the laser welding quality evaluation apparatus that relates to the present invention is shown in FIG. 1. Reference numeral 1 denotes a welding torch. Inside of the welding torch 1 is an optical system that irradiates a laser light A, which is sent out by a laser oscillator 2 through an optical fiber 3, toward a welding subject W. A protective glass 15 is provided at the tip of the welding torch 1 in order to protect the optical system described above.

The welding subject W consists of two steel plates W1 and W2 that have been mutually superimposed on each other. At the time of laser welding, the laser light A is irradiated from the welding torch 1 onto the upper steel plate W1 in a pattern of predetermined size. While in this state, the welding torch 1 moves in a welding direction F in relation to the welding subject W. Moreover, it is also suitable to fix the position of the welding torch 1 and move the welding subject W in the welding direction F.

A CCD camera (imaging means) 8 is attached to a rear-end portion of the welding torch 1. The CCD camera 8 receives, on the same axis as the welding laser light A, the laser light reflected from a melting section 5 and the surrounding area (hereinafter, the melting section 5 and the surrounding area are referred to together as the welding portion accordingly) after this light passes through the protective glass 15 and an optical filter 7. The optical filter 7 is an interference filter with a passband corresponding to the wavelength component of the laser light. The CCD camera 8 receives the image of the melting section 5 and the surrounding area from a reflected light B of the laser light that was transmitted by the optical filter 7.

In general, when laser welding is carried out repeatedly, sputter or the like (hereinafter, referred to as foreign matter for convenience) adheres to the protective glass 15 as described above. If foreign matter is adhered to the protective glass 15, the welding images include images caused by the light reflected off of the foreign matter (hereinafter, referred to as foreign matter images for convenience).

Furthermore, a signal processing device 9 and a quality judgment device 17 are also provided. The signal processing device 9 is arranged to receive the images taken by the CCD camera 8 via a signal wire 10.

In addition, separate from the welding subject, the laser welding quality evaluation apparatus is also equipped with an irradiation board 20. During power monitoring, which is a time when welding is not performed, laser irradiation toward the surface of the irradiation board 20 is carried out in the same manner as when performing laser welding. The CCD camera 8 receives the laser light (reflected laser light) reflected from the irradiation board 20 and obtains visualization images (power monitoring images). These power monitoring images are then recorded in the memory described below.

Note that, if foreign matter is adhered to the protective glass 15, power monitoring images also contain foreign matter images in the same way as the welding images described above.

The signal processing device 9 includes a memory 21 and a difference processing circuit 22 (difference processing means).

The memory 21 records the power monitoring images obtained by the CCD camera 8 as described above.

The difference processing circuit 22 receives input of the welding images taken by the CCD camera 8 in real time and then differentiates the power monitoring images recorded in the memory 21 from the welding images to obtain difference processing reflected light images (also called images after difference processing accordingly). Due to the difference processing performed by the difference processing circuit 22, the foreign matter images included in the welding images and power monitoring images are eliminated and the difference processing reflected light images that are obtained do not include any foreign matter images.

The quality judgment device 17 uses the difference processing reflected light images obtained by the difference processing circuit 22 and conducts the quality judgment. As described above, because the difference processing reflected light images do not include any foreign matter images, the quality judgment device 17 does not receive any influence from the foreign matter that is adhered to the protective glass 15 and can conduct an excellent evaluation of the welding quality.

In other words, according to the present embodiment, the identification of the reflected light subjected to image analysis for quality evaluation and the sampling of the distribution pattern of the reflected light are stable and the reliability of the welding quality judgment result is extremely high.

The inventors of the present invention twice (hereinafter, referred to as example 1 and example 2) carried out the first embodiment through actually conducting laser welding. Consequently, in both example 1 and example 2, the welding images, power monitoring images, and difference processing reflected light images (images after difference processing) were obtained. Furthermore, color images were also obtained based on all of these images. The color images obtained from example 1 and example 2 are shown in FIG. 2(a), (b), and (c). The melting section can be seen in the center of the example 1 (a) and (c) images as an area of light color, and in the center of the example 2(a) and (c) images as a white crescent moon shape and the rear portion thereof. As shown in FIG. 2, by differentiating the power monitoring images (FIG. 2(b)) from the welding images (FIG. 2(a)), the difference processing reflected light images (images after difference processing) (FIG. 2(c)) were obtained based on the reflected light from the original welding.

Next, a second embodiment of the present invention will be described.

In the first embodiment described above, by differentiating the power monitoring image (example 2 (b)) from the welding image (example 2 (a)) as shown in FIG. 2 for example, the background noise was eliminated and a high-quality image (image after difference processing) was obtained. However, in cases where detailed image analysis is required, it is important to be particularly careful when the welding images include brightness that is at the same level as the background. In this case, it is possible to eliminate the portions of the welding images that have brightness at the same level as the background. In an effort to solve the above-mentioned problem, the second embodiment of the present invention has been developed to eliminate only the reflected light components caused by adhesion of sputter or the like that disturb the images. Hereinafter, the method of achieving this is described.

Figure 3:
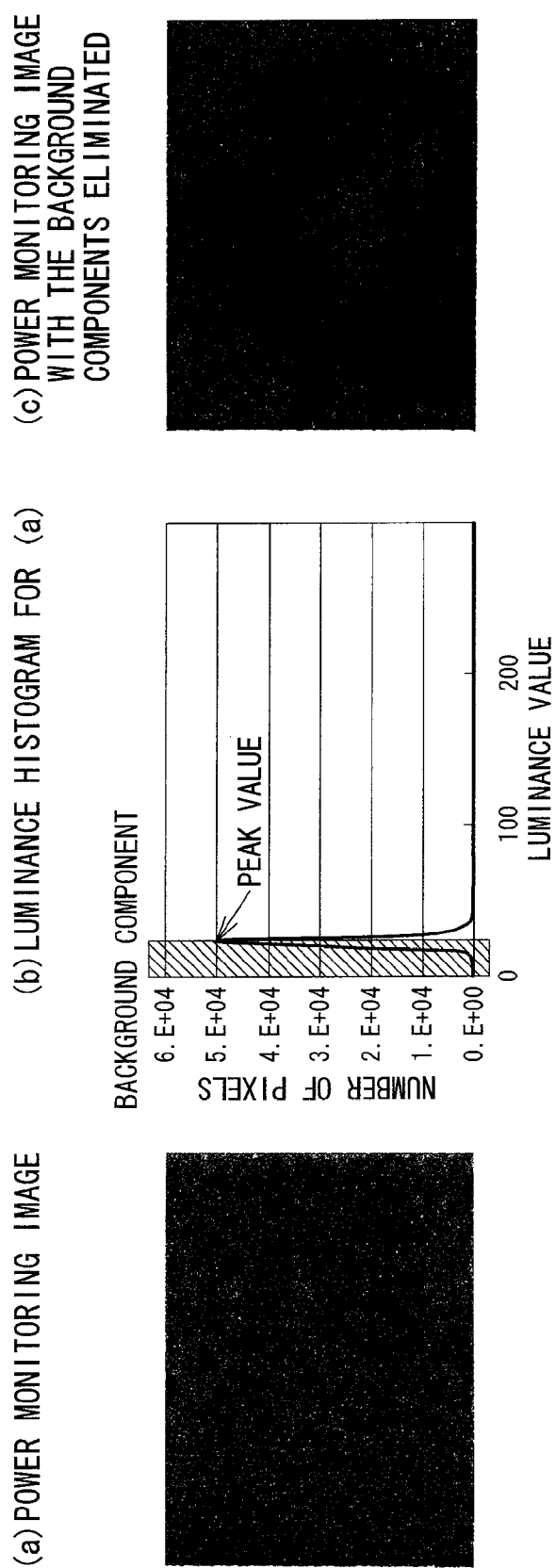
FIG. 3 shows a second embodiment of the present invention, where (a) is a photograph of a power monitoring image, (b) is a luminance histogram, and (c) is a photograph of a power monitoring image with background components eliminated.

In brief, the second embodiment of the present invention eliminates the background components from the power monitoring images (see FIG. 3(a)) and instead of the power monitoring images, uses the "power monitoring images with the background components eliminated" (see FIG. 3(c)) and differentiates them from the welding images to obtain the images after difference processing.

By making a luminance histogram from the power monitoring images (an example of such an image is shown in FIG. 3(a)), it can be seen that, as shown in the luminance histogram in FIG. 3(b), the frequency of the luminance value of the background components other than bright, reflected light is the largest. In other words, there exists a reflected light component that is to be eliminated on the side of the luminance value that is higher than the luminance value that has the maximum frequency. Accordingly, if this high-luminance value is uniformly differentiated from the reflected light images during power monitoring, then the influence of the background component is alleviated and the reflected light images during power monitoring become images based on the reflected light component that is caused by the adherence of sputter ("power monitoring images with the background components eliminated", see FIG. 3(c)). By differentiating the images ("power monitoring images with the background components eliminated") from the images of reflected light during welding (welding images), high-quality images (images after difference processing) can be obtained.

Figure 4:
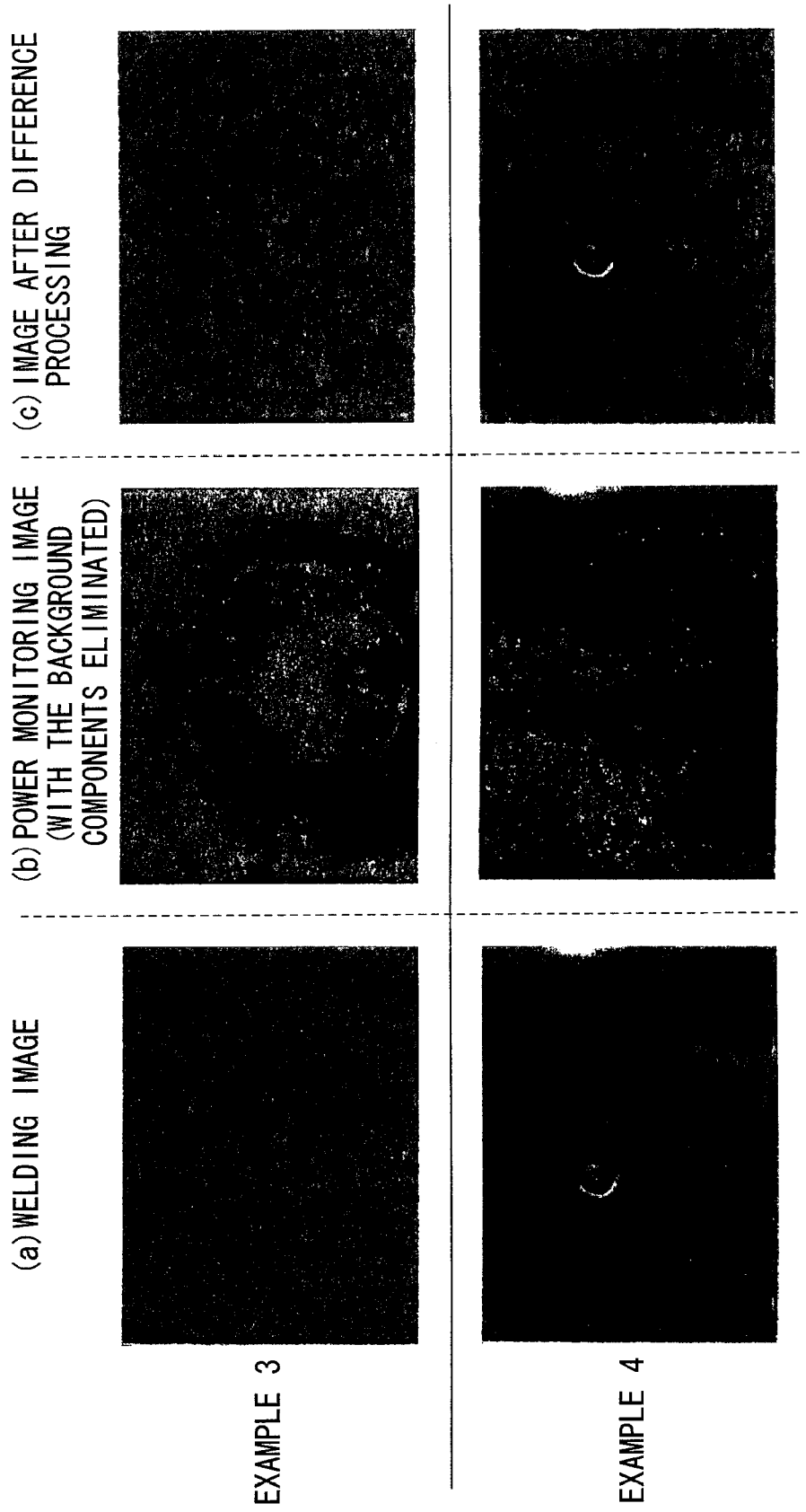
FIG. 4 shows photographs of welding images, power monitoring images with background components eliminated, and difference processing reflected light images from example 3 and example 4, which were examples of implementation of the second embodiment through actually conducting laser welding.

The inventors of the present invention twice (hereinafter, referred to as example 3 and example 4) carried out the second embodiment through actually conducting laser welding. Consequently, in both example 3 and example 4, the welding images, "power monitoring images with the background components eliminated" (images during power monitoring that have had the background component eliminated), and difference processing reflected light images (images after difference processing) were obtained. The images obtained from both example 3 and example 4 are shown in FIG. 4(a), (b), and (c). The melting section can be seen in the center of the example 3(a) and (c) images as an area of light color, and in the center of the example 4(a) and (c) images as a white crescent moon shape and the rear portion thereof. As shown in FIG. 4, by differentiating the power monitoring images (with the background components eliminated) (FIG. 4(b)) from the welding images (FIG. 4(a)), the difference processing reflected light images (images after difference processing) (FIG. 4(c)) can be obtained based on the reflected light from the original welding.

Next, a third embodiment of the present invention will be described.

The third embodiment of the present invention has been developed to obtain even more stable reflected light images through conducting difference processing in a time series. In general, regardless of whether it is during power monitoring or during welding, when the laser is being irradiated, the heat strain on the protective glass 15 has an influence and reflected light caused by the adhesion of sputter fluctuates (the direction of the reflected light (including its position) is different depending on whether heat strain occurs or not and the degree to which it occurs). In this case, even if representative images or an average image during power monitoring is differentiated, it is not possible to eliminate the portion of the image that is affected by the change in position of the reflected light.

Hence, focus is put on the fact that the laser is irradiated at the same output during both power monitoring and welding and therefore produces the same level of heat strain on protective glass 15. Thus, the reflected light images during power monitoring are maintained and updated as time series information and then at the time of welding, the reflected light images during power monitoring are differentiated from the welding images according to the methods in the first and second embodiments of the present invention in a time series starting from when the laser begins irradiating.

Therefore, according to the third embodiment, it is possible to obtain reflected light images (images after difference processing) based only on original welding and that are not influenced by the heat strain on the protective glass 15.

Next, a fourth embodiment of the present invention will be described.

The fourth embodiment of the present invention was developed to allow the status of the protective glass 15 to be judged from the reflected light images during power monitoring.

As the deterioration of the protective glass 15 advances, this can sometimes lead to damage and possibly even have an influence on the optical system of the welding laser. Therefore, focus is put on the fact that other reflected light information during power monitoring that is not the reflected light based on welding can be obtained. Thus, information about the strength and area of the reflected light is extracted and used to determine the status of the protective glass 15.

Figure 5:
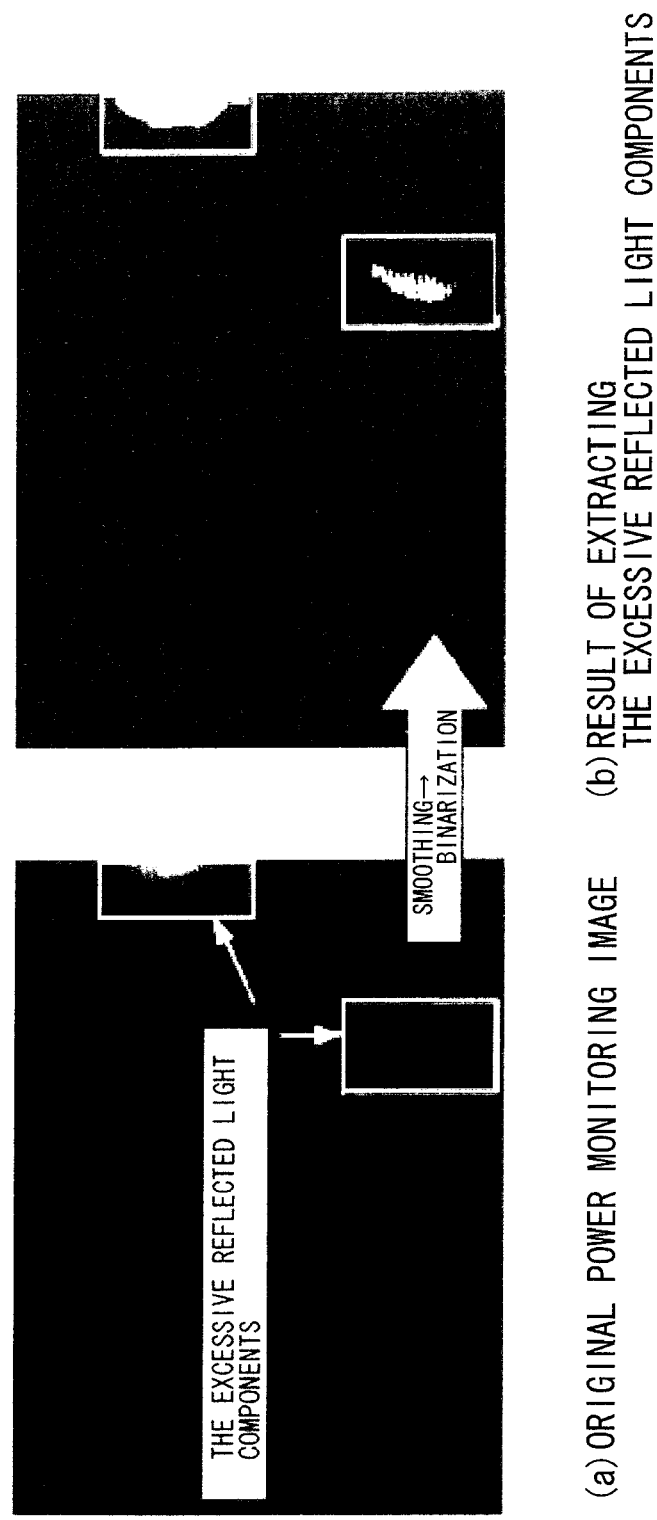
FIG. 5 shows an example of implementation of a fourth embodiment through actually conducting laser welding, where (a) is a photograph of a reflected light image during power monitoring and (b) is a photograph of an image used to make a judgment on a protective glass 15.

In order to achieve this, according to the fourth embodiment, in regard to the reflected light images during power monitoring, smoothing filter processing is conducted in order to eliminate the minute light and dark noise that is included in the images. The images obtained through this processing are binarized at a lower luminance value than the luminance value that should be recognized as the excess reflection component produced by the sputter and the like that is adhered and the images are used to make a judgment about the status of the protective glass 15. Here, the binarization level is, for example, the luminance value that is a predetermined multiple of the luminance value that corresponds to the peak value of the background component obtained from the image luminance histogram. In the example presented below in FIG. 5, the predetermined multiple of the "predetermined multiple of the luminance value" has been set to be triple (×3).

According to this embodiment, the presence of foreign matter on and deterioration of the protective glass 15 can be recognized during power monitoring. As a result, it is possible to plan for production quality declines, such as decreases in laser processing output, without extending the cycle time.

The inventors of the present invention, through actually conducting laser welding, conducted smoothing processing on the reflected light images during power monitoring (the image is shown in FIG. 5(a)) as described above and furthermore, also conducted binarization processing at the binarization level described above (a luminance value that is triple the luminance value that corresponds to the peak value of the background component) and thus obtained the image for making a judgment about the status of the protective glass 15 (the image is shown in FIG. 5(b)). In the image in FIG. 5(b), there are two remaining fields (fields of strong light on the right side and lower right side of FIG. 5(b)) where the reflected light is strong.

The left and right edges and top and bottom edges of the field of strong light are used to calculate the rough area of the field. If the rough area that is calculated is greater than the previously determined threshold, then a judgment is made that there are excess reflective components included in the reflected light image during power monitoring, that is to say, that there is information of reflected light other than reflected light based on welding, and thus sputter is adhered to the protective glass 15 or that the protective glass 15 is deteriorating.

Based on the result of the judgment, the operator receives a report of the obtained result. This report will make it possible to appropriately set the inspection period for the laser welding device and to optimize the operation of the device.

The invention claimed is:

1. A laser welding quality evaluation method which irradiates a laser light toward a welding portion and receives a reflected laser light from the welding portion through a protective glass that protects an optical system of a laser, images the welding portion using the received reflected laser light, and evaluates a welding quality using the welding image that is obtained by the imaging, the laser welding quality evaluation method comprising the steps of:

obtaining a power monitoring image by imaging an irradiation board separately provided in place of the welding portion during power monitoring, which is a time when welding is not performed, using a reflected laser light from the irradiation board, the power monitoring image being obtained through the protective glass that protects the optical system of the laser;

differentiating the power monitoring image from the welding image so as to obtain a difference processing reflected light image for evaluating the welding quality; and utilizing heat strain produced on the protective glass due to the same output of laser irradiation occurred both at the power monitoring and the welding to maintain and update reflected light images during the power monitoring as time series information, and obtaining the reflected light images through a difference processing based on the welding not influenced by the heat strain on the protective glass.

2. The laser welding quality evaluation method according to claim 1, wherein, in the power monitoring image obtaining step, the power monitoring image is obtained in a time series starting from when the laser begins irradiating, and the obtained time series power monitoring image is recorded, and in the difference processing step, the welding image is obtained in a time series starting from when the laser begins irradiating and the time series power monitoring image is differentiated from the time series welding image by synchronizing the two time series.

3. A laser welding quality evaluation apparatus which irradiates a laser light toward a welding portion and receives a reflected laser light from the welding portion through a protective glass that protects an optical system of a laser, images the welding portion using the received reflected laser light, and evaluates a welding quality using the welding image that is obtained by the imaging, the laser welding quality evaluation apparatus comprising:

a device that obtains a power monitoring image by imaging an irradiation board separately provided in place of the welding portion during power monitoring, which is a time when welding is not performed, using a reflected laser light from the irradiation board, the power monitoring image being obtained through the protective glass that protects the optical system of the laser; and a device that differentiates the power monitoring image from the welding image so as to obtain a difference processing reflected light image for evaluating the welding quality;

wherein heat strain produced on the protective glass due to the same output of laser irradiation occurred both at the power monitoring and the welding is utilized to maintain and update reflected light images during the power monitoring as time series information, and obtaining the reflected light images through a difference processing based on the welding not influenced by the heat strain on the protective glass.

4. The laser welding quality evaluation apparatus according to claim 3, wherein, in the device that obtains the power monitoring image, the power monitoring image is obtained in a time series starting from when the laser begins irradiating, and the obtained time series power monitoring image is recorded, and in the device that differentiates the power monitoring image from the welding image, the welding image is obtained in a time series starting from when the laser begins irradiating, and the time series power monitoring image is differentiated from the time series welding image by synchronizing the two time series.

* * * * *

UNITED STATES PATENT AND TRADEMARK OFFICE
CERTIFICATE OF CORRECTION

PATENT NO.       : 8,633,419 B2                                      Page 1 of 1
APPLICATION NO.  : 12/514549
DATED            : January 21, 2014
INVENTOR(S)      : Kawazoe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1286 days.

Signed and Sealed this
Twenty-second Day of September, 2015

Michelle K. Lee
*Director of the United States Patent and Trademark Office*